(12) United States Patent
Perez et al.

(10) Patent No.: US 10,860,246 B2
(45) Date of Patent: Dec. 8, 2020

(54) PERSISTENT MEMORY UPDATING

(71) Applicant: HEWLETT-PACKARD DEVELOPMENT COMPANY, L.P., Houston, TX (US)

(72) Inventors: Taciano Perez, Porto Alegre (BR); Diego Medaglia, Porto Alegre (BR); Tadeu Marchese, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/075,639

(22) PCT Filed: Dec. 21, 2016

(86) PCT No.: PCT/US2016/068019
§ 371 (c)(1),
(2) Date: Aug. 4, 2018

(87) PCT Pub. No.: WO2018/118040
PCT Pub. Date: Jun. 28, 2018

(65) Prior Publication Data
US 2019/0310796 A1    Oct. 10, 2019

(51) Int. Cl.
*G06F 11/00*   (2006.01)
*G06F 3/06*    (2006.01)
(Continued)

(52) U.S. Cl.
CPC .......... *G06F 3/0659* (2013.01); *G06F 3/0604* (2013.01); *G06F 3/0679* (2013.01);
(Continued)

(58) Field of Classification Search
CPC ............... G06F 3/0659; G06F 12/0292; G06F 12/0246; G06F 8/654; G06F 12/1009;
(Continued)

(56) References Cited

U.S. PATENT DOCUMENTS 6,772,296 B1   8/2004   Mathiske
7,395,278 B2   7/2008   Zwilling et al.
(Continued)

FOREIGN PATENT DOCUMENTS

TW    200641604 A    12/2006
WO    2015122925 A1    8/2015

OTHER PUBLICATIONS

Dulloor et al., "System Software for Persistent Memory", Retrieved from Internet—https://pdfs.semanticscholar.org/544c/1ddf24b90c3dfba7b1934049911b869c99b4.pdf,2014, 15 Pages.

*Primary Examiner* — Yair Leibovich
(74) *Attorney, Agent, or Firm* — HP Inc. Patent Department

(57) ABSTRACT

Examples associated with persistent memory updating are described. One example includes receiving a first store instruction associated with a first page of memory in a persistent memory from an application. The first page is copied to a new page of the persistent memory. A virtual address space of the application is updated to a location of the new page in a read-write mode. The first store instruction is executed on the new page. A file mapping in the persistent memory is updated from a location of the first page to the location of the new page, and the virtual address space for the location of the new page is updated to a read-only mode.

20 Claims, 7 Drawing Sheets

(51) Int. Cl.
  *G06F 11/14* (2006.01)
  *G06F 12/1009* (2016.01)
  *G06F 8/654* (2018.01)
  *G06F 12/02* (2006.01)

(52) U.S. Cl.
  CPC .......... *G06F 8/654* (2018.02); *G06F 11/1469* (2013.01); *G06F 12/0246* (2013.01); *G06F 12/0292* (2013.01); *G06F 12/1009* (2013.01); *G06F 2212/7201* (2013.01)

(58) Field of Classification Search
  CPC .. G06F 11/1469; G06F 3/0679; G06F 3/0604; G06F 2212/7201
  USPC .......................................................... 714/19
  See application file for complete search history.

(56) References Cited

U.S. PATENT DOCUMENTS

| | | | |
|---|---|---|---|
| 9,411,533 B2 | 8/2016 | Santry | |
| 9,430,396 B2 | 8/2016 | Kumar et al. | |
| 2006/0212481 A1* | 9/2006 | Stacey | G06F 16/10 |
| 2007/0028056 A1 | 2/2007 | Harris | |
| 2012/0254120 A1 | 10/2012 | Fang et al. | |
| 2014/0195480 A1 | 7/2014 | Talagala et al. | |
| 2016/0267015 A1 | 9/2016 | Li et al. | |
| 2017/0039142 A1* | 2/2017 | Sundararaman | G06F 3/0673 |

* cited by examiner

PERSISTENT MEMORY UPDATING

BACKGROUND

The development of non-volatile memory technologies (e.g., phase-change memory, spin-transfer torque memory, resistive memory, memristor) has begun to cause a technology shift towards persistent memory. These technologies may be accessible at speeds previously only obtainable for data held in a volatile memory (e.g., a cache). Further, persistent memory may be directly manipulated by a processor via load and store instructions without losing data due to a loss of power.

BRIEF DESCRIPTION OF THE DRAWINGS

The present application may be more fully appreciated in connection with the following detailed description taken in conjunction with the accompanying drawings.

DETAILED DESCRIPTION

Systems, methods, and equivalents associated with persistent memory updating are described. As discussed above, as persistent memory becomes more common, applications will begin to be developed to take advantage of the benefits of the speed and reliability of persistent memory. For example, applications have begun to explore the ability to directly access persistent memory, resulting in faster applications with fewer design concerns regarding managing memory. However, one of the challenges of any memory system is ensuring that the ACID properties (atomicity, consistency, isolation, and durability) are maintained to avoid unnecessary errors in stored data in the face of failures such as application crashes, power losses, and so forth. Improper handling of memory stores and logging may result in inconsistent or corrupt data, as well as data that remains in a volatile memory but has not yet been made persistent on the persistent memory.

Consequently, systems and methods disclosed herein employ a set of logging and copy-on-write techniques to ensure atomicity, consistency, and durability of changes made to persistent memory by applications. When a transaction seeks to make changes to data stored in the persistent memory, that instruction will cause a copy of that data to be created in persistent memory. When the transaction commits, changes to the copy are made persistent, appropriate addresses are updated, and a record of the transaction is closed to signify that the transaction is completed. If a crash occurs prior to logging completion of the transaction, because the original data is still in memory, a number of memory addresses may be updated in page tables and/or file mappings to revert the persistent memory and/or application to a known valid state. This may be faster than undoing actions using, for example, undo logs. Further, using copy-on-write as described herein may reduce overhead over other techniques that use complex data structures and/or checksums to determine if a page is already in use.

Figure 1:
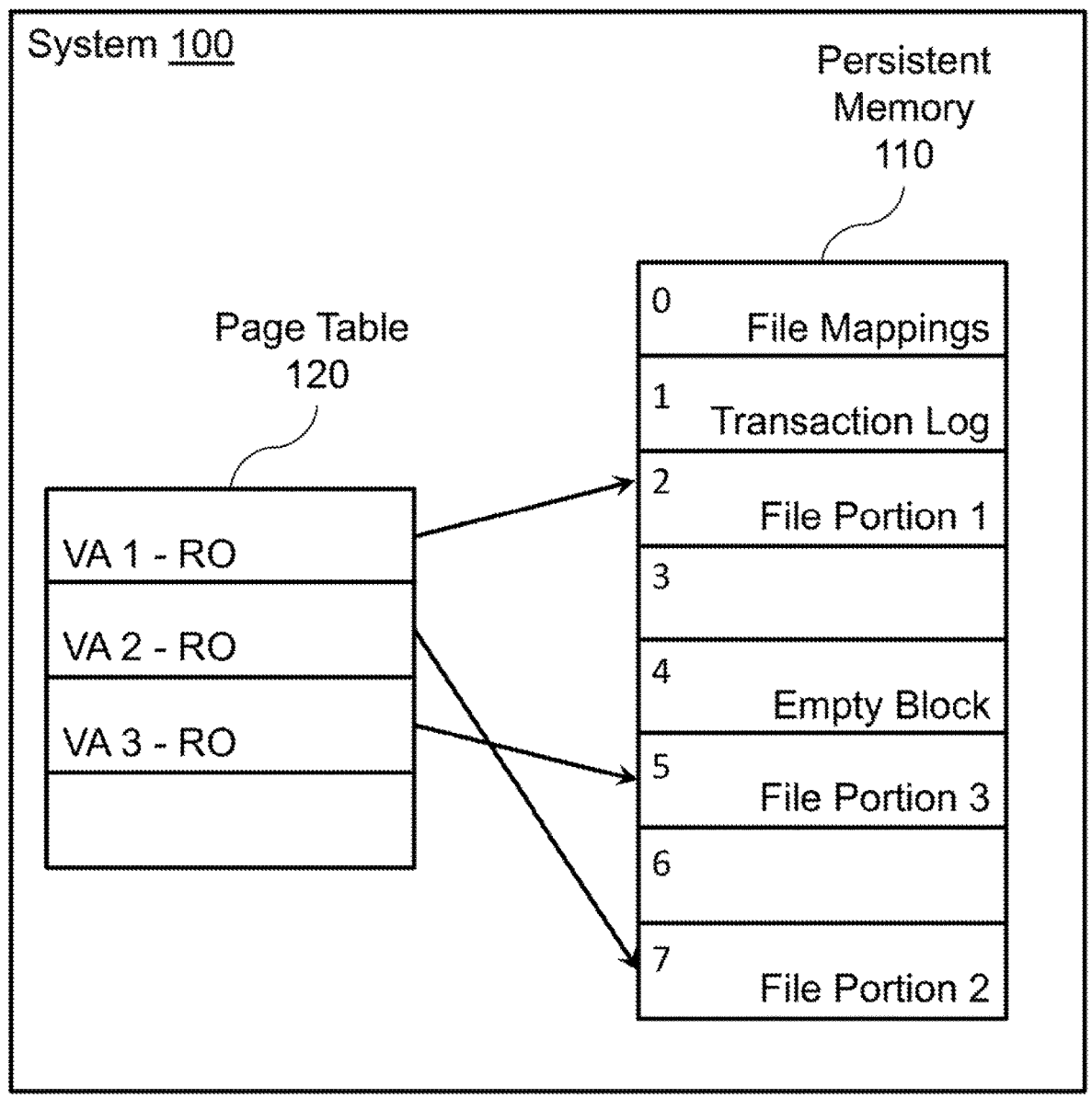
FIG. 1 illustrates an example system associated with persistent memory updating.

FIG. 1 illustrates an example system associated with persistent memory updating. It should be appreciated that the items depicted in FIG. 1 are illustrative examples, and many different systems, devices, and so forth, may operate in accordance with various examples.

FIG. 1 illustrates an example system 100. System 100 is illustrated in a state prior to initiation of a transaction which will be described below. System 100 includes a persistent memory 110. As used herein, a persistent memory refers to a memory that can be directly manipulated by a processor via load and store instructions, while still maintaining content during a loss of power. Consequently, volatile memory would not be persistent because it loses its contents during a power cycle, and a hard disk would not be considered 'memory' because it is not directly accessible by a processor. Persistent memory 110 includes several blocks 0-7 containing a variety of data. While 8 blocks are illustrated, persistent memory 110 may have numerous blocks containing other file data, metadata, and so forth, which are not shown in FIG. 1. Persistent memory 110 may be, for example, phase-change memory, spin-transfer torque memory, resistive memory, memristor, and so forth.

Block 0 of persistent memory 110 contains a set of file mappings that describe which blocks of persistent memory 110 contain which portions of files. In the 8 blocks illustrated, a file is split across three blocks. A first portion of the file is in block 2 of persistent memory 110, a second portion is in block 7, and a third portion is in block 5. Consequently, the file mappings in block 0 of persistent memory 110 may describe which blocks of persistent memory 110 store which portions of files. As can be seen, files may be spread across multiple, non-adjacent blocks of persistent memory 110 in arbitrary ordering. In other examples, single files may be stored in single blocks, multiple files may be stored in single blocks, and so forth.

Persistent memory 110 also includes a transaction log in block 1. The transaction log may be used to facilitate rolling back changes resulting from failed transactions to modify blocks of persistent memory 110. In the example illustrated in FIG. 1, persistent memory 110 also includes an empty block in block 4. Blocks 3 and 6 of persistent memory 110 may contain portions of other files, be empty, include data relevant to the metadata of persistent memory 110, and so forth.

System 100 also includes a page table 120. Page table 120 may be an in-memory table to translate virtual addresses used by an application to physical addresses in persistent memory 110. By way of illustration, page table 120 may operate within a memory management unit of system 100, a volatile memory of system 100, and so forth. In this example, an application has loaded the file into memory. Consequently, virtual address 1 points to memory block 2, virtual address 2 points to memory block 7, and virtual address 3 points to memory block 5. Prior to initiation of a transaction initiated by the application to modify the file or a portion thereof, page table 120 also indicates to one or more of the application and system 100 that the blocks in persistent memory 110 are in a read-only state. As a result of the application issuing store instructions targeting persistent memory addresses, data may be temporarily held in processor caches (not shown) accessible by a processor (not shown) before the data is eventually flushed to persistent memory. As a consequence, data modified may not be preserved in a non-volatile state until the application signals that the modifications should be flushed to persistent memory 110. Thus, system 100 may provide mechanisms (e.g., processor instructions) that flush memory ranges to ensure that data is committed to persistent memory 110.

These preservation requests may be grouped into transactions that vary in size and complexity depending on the number of blocks of persistent memory 110 affected and the number of changes made. For simple cases, transactions may modify single pages of persistent memory 110 and complete shortly after the change has been made, while more complex transactions may modify multiple pages. Because of the aforementioned desirability of the ACID properties of transactions to prevent data corruption, it is valuable to be able to roll back changes if, prior to completion of the transaction, a failure occurs that interrupts some aspect of the transaction.

Thus, the state of system 100 illustrated in FIG. 1 may illustrate the state of system 100 prior to initiation of a transaction by an application to modify the file in persistent memory 110 after having mapped the file to the virtual address space of the application in page table 120. Prior to the application making changes, the application may first initiate the transaction. Initiating the transaction may involve, for example, invoking a library function or system call that signifies the beginning of a new transaction. The function or system call may be explicitly included in the application by a programmer, implicitly inferred by a programming language complier or interpreter, and so forth. The notification may be provided to an operating system, to persistent memory 110, and so forth. At this point, a new entry associated with this transaction may be created in the transaction log of persistent memory 110. As with other blocks in persistent memory 110, data in the transaction log may be in volatile caches while being modified, and changes to the transaction log may periodically be made persistent by flushing changes from the volatile cache to persistent memory 110.

Once the transaction log reflects the beginning of the transaction, the application may now begin making changes to the file. The first time a store instruction targets a page of persistent memory 110, a page fault may be triggered because that page may be in a read-only mode. As discussed above, in this example, page table 120 reflects the read-only state of blocks of persistent memory 110. In other examples, persistent memory 110 itself may track whether blocks of memory are in a read-only state, a read-write state, and so forth. For this example, it will be assumed that the application executed a store instruction associated with portion 2 of the file in block 7 of persistent memory 110.

To handle the page fault, the portion of the file in block 7 of persistent memory 110 may be copied to an empty block of persistent memory 110. In this example, block 4 of persistent memory 110 may be used. This block may be set to a read-write state that will be maintained until the end of the transaction. Additionally, the virtual address in page table 120 used by the application for the second block of the file (VA 2) may be updated both to reflect the read-write state and the new physical address of the second portion of the file in block 4 of persistent memory 110. The transaction log may also be updated to note the relationship between the un-modified version of the second portion of the file in block 7, and the new copy of the second portion of the file in block 4.

At this point, the store instruction associated with the second portion of the file can be executed. This may cause the version of the second portion in the volatile memory to be stored in block 4 of persistent memory 110. Going forward, when the application issues a store instruction associated with the second portion of the file, because block 4 of persistent memory 110 is in a read-write state, store instructions can proceed directly to flushing data from volatile cache to block 4 in persistent memory 110 without performing additional data copies or logging.

When the application Indicates the transaction is completed, system 100 may begin taking measures to ensure persistence of changes made to the file in association with the transaction. First, if there is transaction metadata that has not yet been stored in persistent memory 110, that metadata may be flushed to the transaction log. As discussed above, this metadata may describe which blocks of files have been copied to create a read-write version in persistent memory 110. Next (or simultaneously), file data not yet migrated from volatile cache to corresponding blocks of persistent memory 110 may also be made persistent. By way of illustration, continuing with the example above, if a change made to the second portion of the file is still in a cache of system 100, that change may be flushed to the read-write copy of the second portion in block 4 of persistent memory 110.

Once system 100 is sure that the transaction log and blocks of persistent memory 110 associated with the transaction have been made persistent, system 100 may update the file mappings to reflect that the block containing the read-write copy now stores the second portion of the file. Additionally, persistent memory 110 and/or page table 120 may be updated to reflect that the read-write copy is now in a read-only mode. After completion of these actions, completion of the transaction may be recorded and flushed to the transaction log, signifying that data associated with the transaction is current and ready for a future transactions. At this point, persistent memory 110 has file mappings indicating a first portion of the file is in block 2, a second portion of the file is now in (previously empty) block 4, and a third portion of the file is in block 5. Block 7 of persistent memory 110, while containing a prior version of the second portion of the file, may now be treated as empty and usable in the future. Additionally, page table 120 reflects the physical addresses described above, each of which indicates it is in a read-only mode, until a future transaction attempts to modify one of the pages, at which point the above described process may begin again.

If at any point during execution of a transaction an aspect of system 100 fails, various measures may be taken to ensure the ACID properties of transactions for persistent memory 110. Specific measures taken may depend on the type of failure experienced (e.g., power loss, application crash, transaction conflict), the data lost, and the memory technologies used by system 100. By way of illustration, some systems may employ a non-volatile memory with a short term battery that allows the non-volatile memory to flush its contents to a durable media. This may allow the transaction to recover from certain types of failures and proceed as normal.

In the event of a failure during the middle of a transaction, there are several time periods during which different changes may need to be made. First, if the transaction log for a transaction has no entries describing copy-on-write actions to create read-write copies of read-only memory blocks, no action needs to be taken except possibly removal of the transaction itself from the transaction log. When there are entries describing copy-on-write actions, both page table 120 and the file mappings in persistent memory 110 may need to be reverted to an address of the original read-only memory block. By way of illustration, in the above example, if a failure occurred after copying block 7 to block 4 and updating page table 120 to reflect the copy, page table 120 may be reverted to point back to block 7 in a read-only mode so that system 100 is sure that the application is accessing a valid version of the second portion of the file. Additionally, if the failure occurred after file mappings in persistent memory 110 were updated but before the transaction was marked as completed, the file mappings may also need to be reverted to signify that the second portion of the file is in block 7. Once failure recovery has been completed, system 100 may allow transactions to resume as appropriate.

In some example embodiments, multiple transactions may seek to modify the same block of persistent memory 110. Assuming conflicts, race conditions, data locks, and so forth are appropriately managed, the transactions may be allowed to access the same block of memory to access different files, to access the same files, and so forth. To facilitate this the multiple transactions may be merged into a single transaction in the transaction log. To merge transactions, the transaction log may be updated so that copied data blocks associated with the multiple transactions are instead associated with a single, merged transaction. In these examples, actions taken in association with completion of the merged transaction may be delayed until each merged transaction has indicated its completion.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
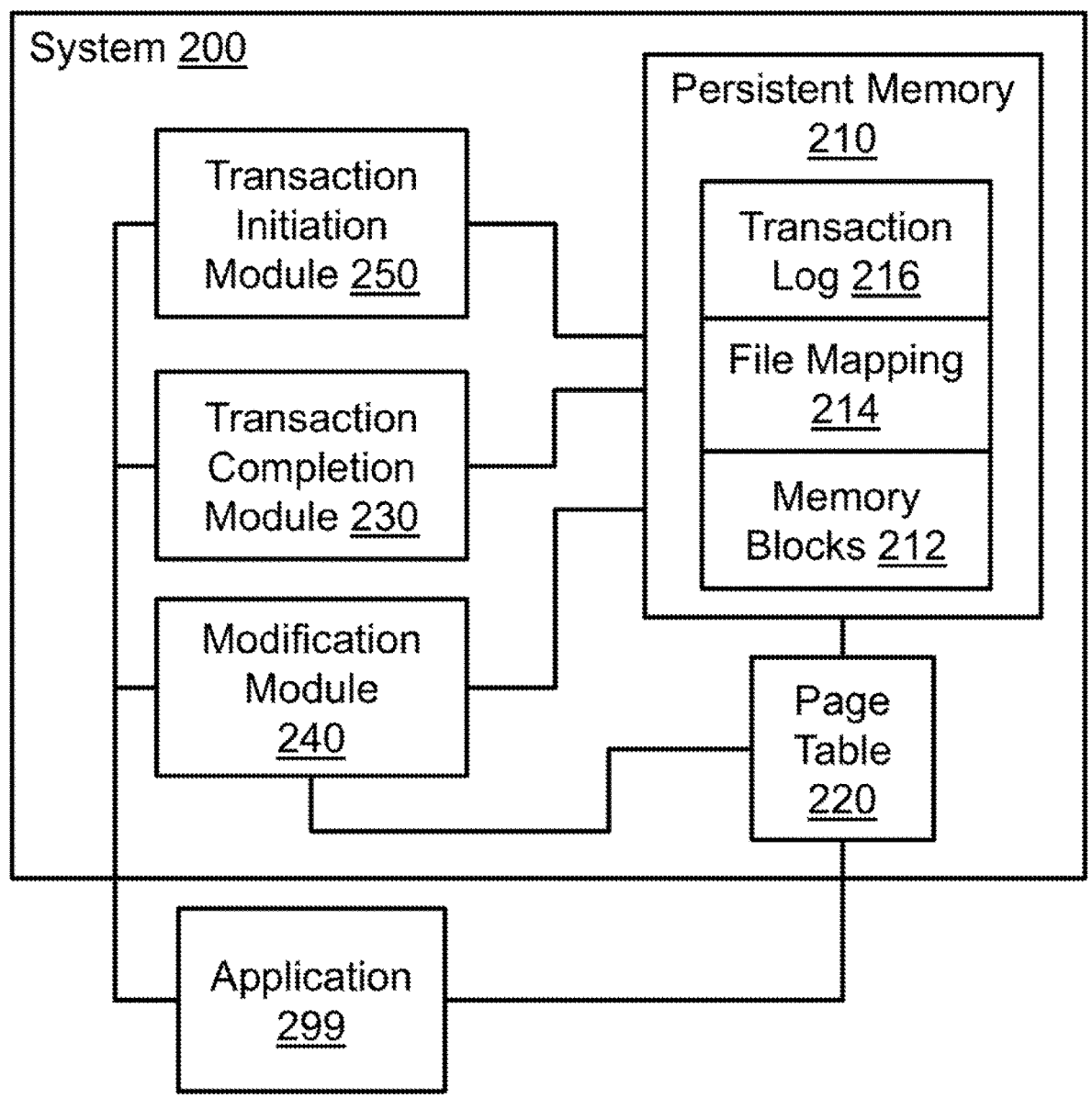
FIG. 2 illustrates another example system associated with persistent memory updating.

FIG. 2 illustrates an example system 200 associated with persistent memory updating. System 200 includes a persistent memory 210. Persistent memory 210 may be, for example, phase-change memory, spin-transfer torque memory, restrictive random-access memory, memristor, and so forth. Persistent memory 210 includes a set of memory blocks 212. Memory blocks 212 may store portions of files. Persistent memory 210 also includes a file mapping 214. File mapping 214 may map portions of files to memory blocks 212 in which the portions of files are stored. Depending on sizes of files, a single file may be spread across many memory blocks 212, multiple files may be stored within a single memory block, and so forth. Persistent memory 210 also includes a transaction log 216. Transaction log 216 may be used to aid in maintaining one or more of the ACID properties (atomicity, consistency, isolation, and durability) of transactions run to change contents of memory blocks 212.

System 200 also includes a page table 220. Page table 220 may map virtual addresses used by an application 299 to memory blocks 212 of persistent memory 210. While in this example, application 299 is illustrated as external to system 200, in many cases, application 299 may be a process executed by a processor embedded in system 200 (not shown). Consequently, application 299 may load data from memory blocks 212 into a volatile memory (e.g., a cache; see e.g., system 300 in FIG. 3), make changes to data in the volatile memory, and store the changes back to persistent memory 210.

System 200 also includes a transaction initiation module 250. When application 299 initiates a transaction intending to make a change to a memory block 212, transaction initiation module 250 may create a transaction record in transaction log 216. The transaction record may be used by system 200 in the event of a failure to restore persistent memory 210 to a prior valid state.

System 200 also includes a modification module 240. When modification module 240 receives an instruction from application 299 to modify a read-only memory block 212, modification module 240 may create a read-write copy of the read-only memory block in persistent memory 210. The read-write copy may be used by application 299 during the transaction to store changes to the read-only memory block until application 299 is ready to complete the transaction. Modification module 240 may then record an association between the read-only memory block and the read-write copy in the transaction record. In the event of a failure of an aspect of the transaction (e.g., due to a power failure) the association may facilitate reverting persistent memory 210 to a known valid state. Modification module may also update an address in page table 220 associated with the read-only memory block to an address associated with the read-write copy. This allows application 299 to make changes to the read-write copy while preserving the original version of the read-only memory block.

System 200 also includes a transaction completion module 230. Transaction completion module 230 may receive an instruction from application 299 that the transaction is complete. At this point, transaction completion module 230 may ensure persistence of the transaction record in transaction log 216, as well as persistence of changes made to the read-write copy. This may involve, for example, flushing a data associated with the transaction record and/or the read-write copy stored in a volatile memory to appropriate blocks of persistent memory 210. Transaction completion module 230 may then update a file mapping 214 associated with the read-only memory block to point to the read-write copy, and record completion of the transaction in transaction log 216. Recording completion of the transaction may signify that the transaction successfully completed and that the version of blocks manipulated by the transaction can serve as a new known valid state for future transactions.

Figure 3:
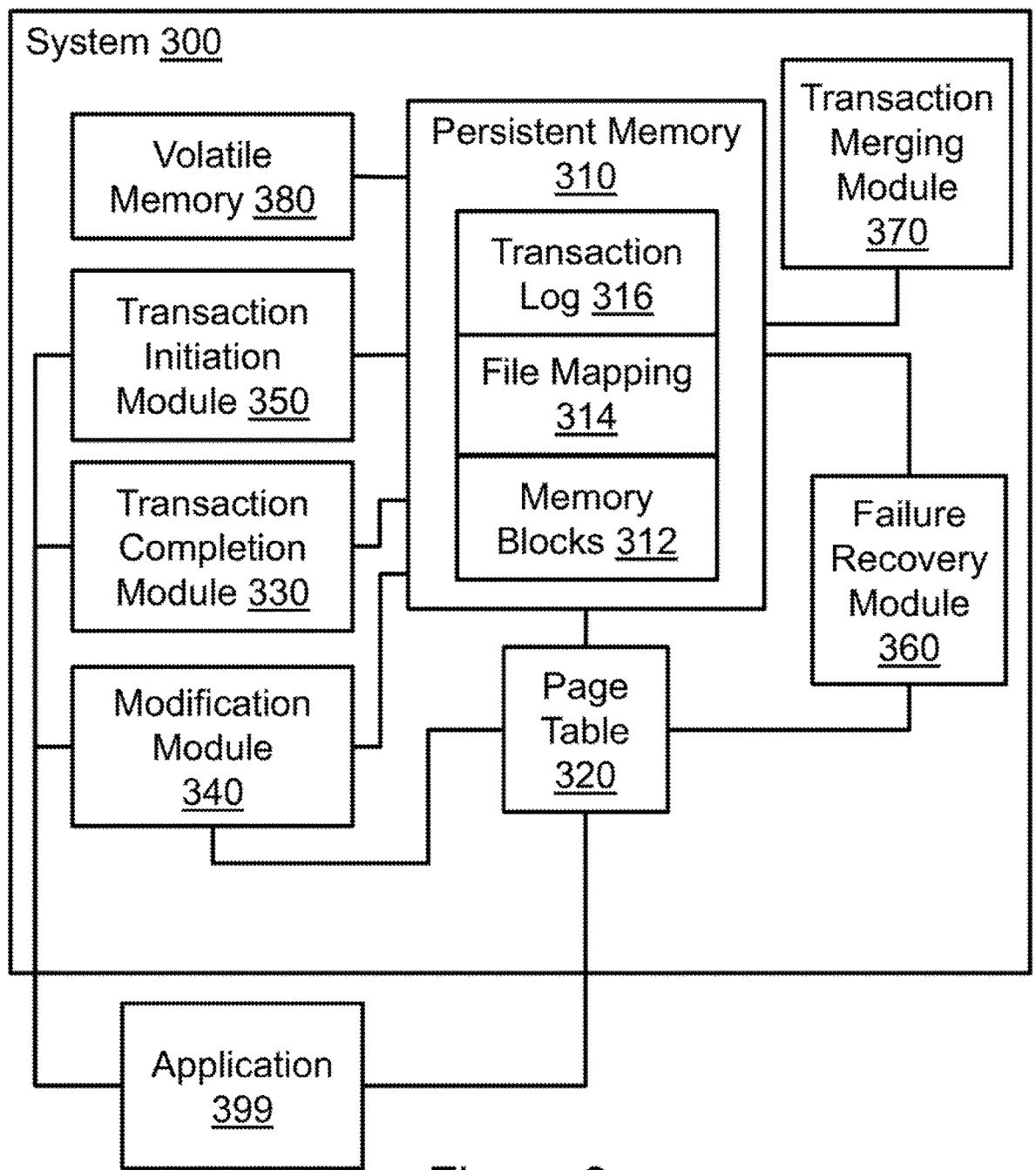
FIG. 3 illustrates another example system associated with persistent memory updating.

FIG. 3 illustrates a system 300 associated with persistent memory updating. System 300 includes several items similar to those described above with reference to system 200 (FIG. 2). For example, system 300 includes a persistent memory 310 including a transaction log 316, file mapping 314, and memory blocks 312. System 300 also includes a page table 320, a transaction initiation module 350, a transaction completion module 330, and a modification module 340. Various components of system 300 may be accessed by an application 399 which, while illustrated external to system 300, may be executed on a processor within system 300.

System 300 also includes a failure recovery module 360. Failure recovery module 360 may detect a failure of an aspect of system 300. Failure may be due to, for example, a power loss, an application crash, and so forth. When a failure occurs prior to completion of a transaction being recorded in transaction log 316, failure recovery module 360 may restore one or more of a page table entry and a file mapping to a prior state. This may be based on entries in transaction log 316 associated with incomplete transactions. This may revert address pointers to point at memory blocks containing a known valid state of persistent memory 310.

System 300 also includes a transaction merging module 370. Transaction merging module may merge transactions when two transactions send store instructions associated with the same read-only memory block. These two transactions may be associated with the same application 399, or multiple applications 399. In this example, transaction completion module 330 may wait to act until instructions indication completion of both transactions before taking actions in association with completion of either transaction.

System 300 also includes a volatile memory 380. Volatile memory 380 may be, for example, a cache. Thus, ensuring persistence of changes made to the read-write copy may involve flushing changes made to a version of the read-write copy in the volatile memory to the read-write copy in the persistent memory.

Figure 4:
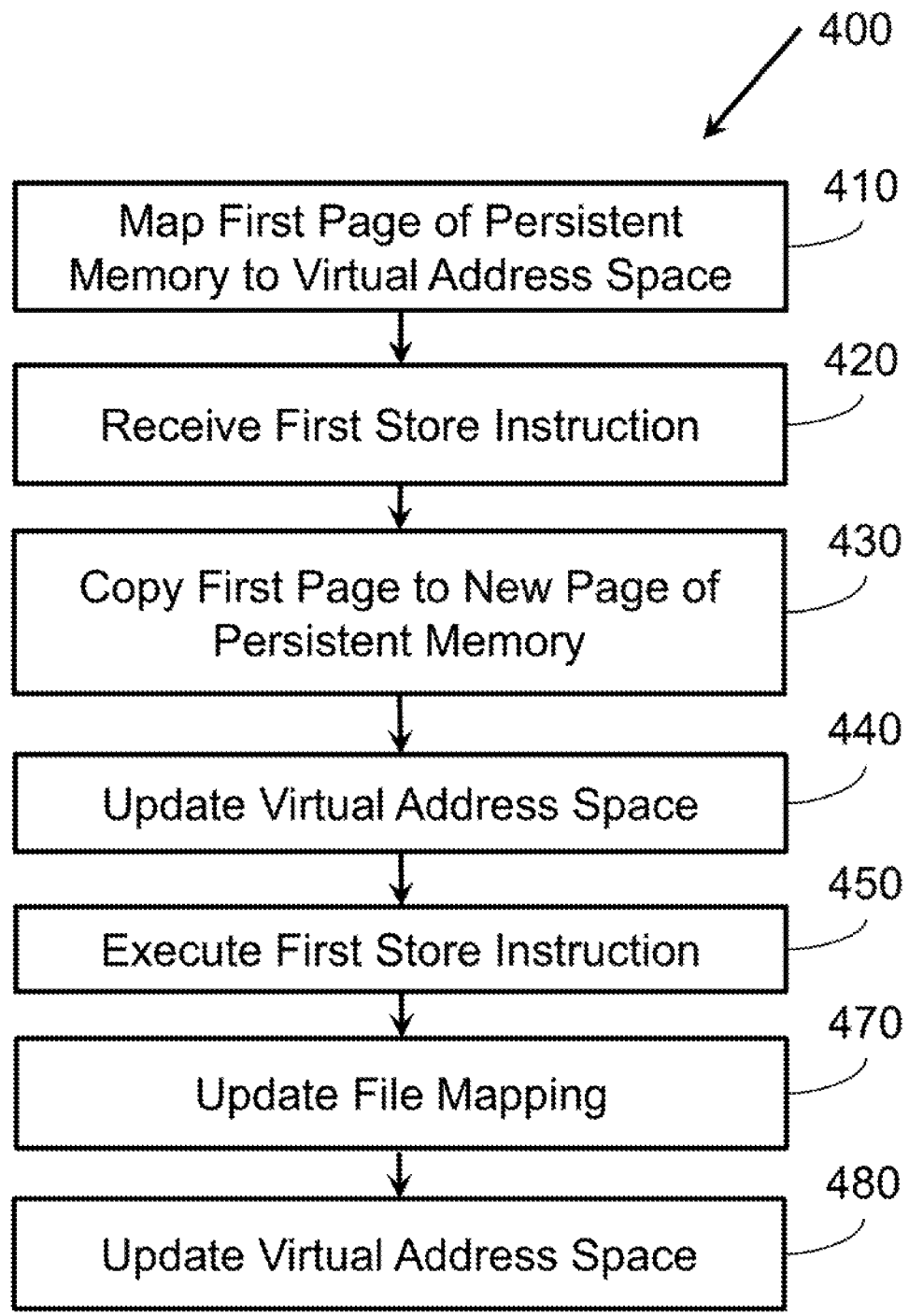
FIG. 4 illustrates a flowchart of example operations associated with persistent memory updating.

FIG. 4 illustrates an example method 400 associated with persistent memory updating. Method 400 may be embodied on a non-transitory processor-readable medium storing processor-executable instructions. The instructions, when executed by a processor, may cause the processor to perform method 400. In other examples, method 400 may exist within logic gates and/or RAM of an application specific integrated circuit (ASIC).

Method 400 includes mapping a first page of a persistent memory to an application's virtual address space at 410. The mapping may indicate the first page is in a read-only mode. The read-only mode may be used to prevent overwriting of a known valid state of data in the persistent memory.

Method 400 also includes receiving a first store instruction from the application at 420. The first store instruction may be associated with the first page. The first store instruction may indicate the application seeks to make persistent changes that the application has made to a version of the first page in a volatile memory.

Method 400 also includes copying the first page to a new page of persistent memory at 430. Method 400 also includes updating the application's virtual address space at 440. The applications virtual address space may be updated to a location of the new page in the persistent memory. Further, this mapping may indicate the new page is in a read-write mode. This copy-on-write may be made to preserve the original version in case a transaction fails Method 400 also includes executing the first store instruction at 450. The first store instruction may be executed on the new page. Depending on the nature of the store instructions, the store instruction may overwrite the entire new page, replace a portion of the new page, cause an operation to be performed on data in the new page, and so forth.

Method 400 also includes updating a file mapping in the persistent memory at 470. The file mapping may be updated from a location of the first page to the location of the new page. Updating the file mapping may occur during a process related to completing the transaction. Additionally, updating of the file mapping may signify the new page now has the current valid version of the page and that the read-only page does not have data relevant to the current valid version any longer. A later transaction may treat the read-only page as an empty block into which a copy on write may be performed.

Method 400 also includes updating the application's virtual address space at 480. The application's virtual address space may be updated to indicate the new page is in a read-only mode. Setting the virtual address space associated with the new page may ensure that further changes to the page will result in a new transaction and/or copy-on-write of data.

Figure 5:
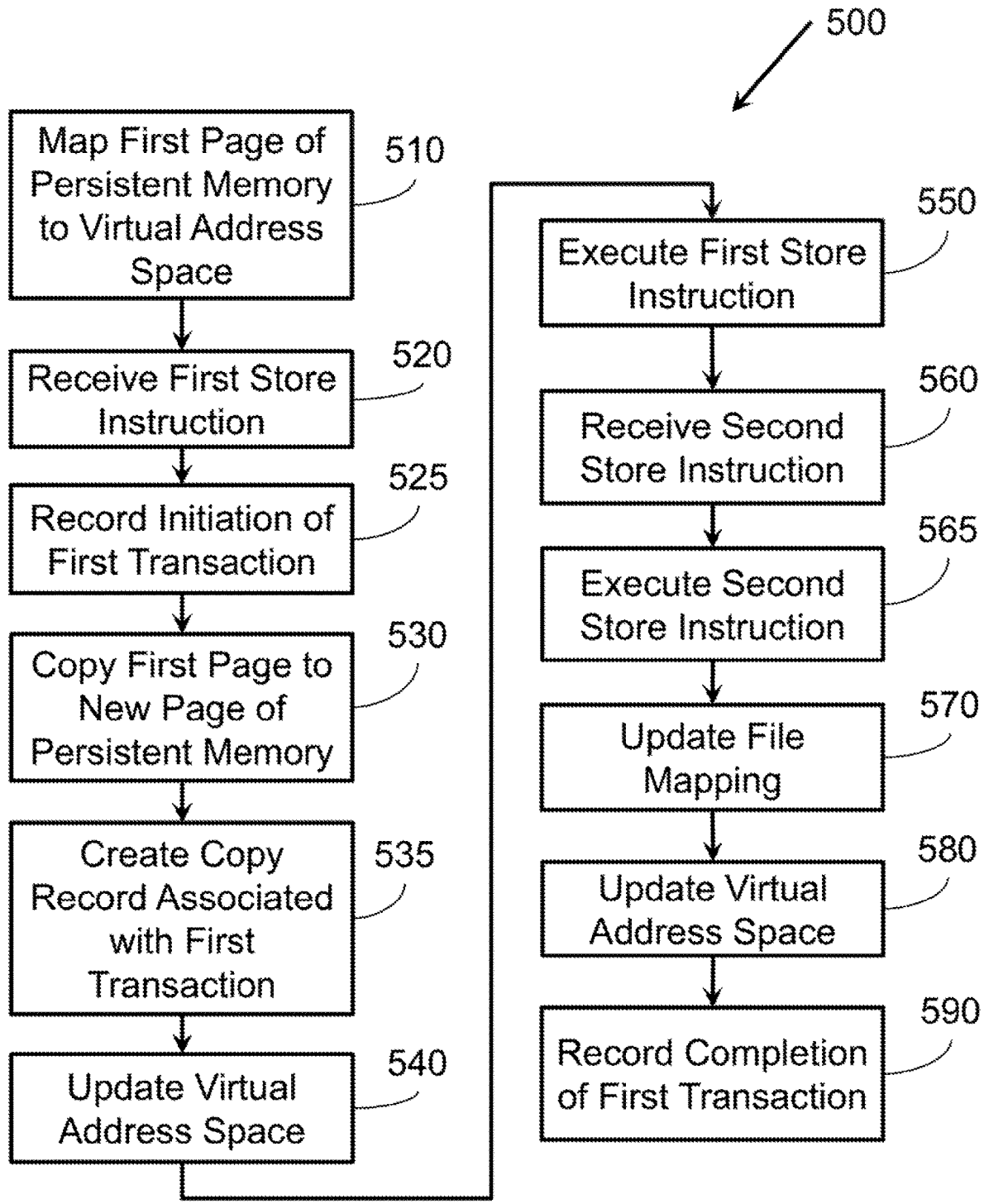
FIG. 5 illustrates another flowchart of example operations associated with persistent memory updating.

FIG. 5 illustrates a method 500 associated with persistent memory updating. Method 500 includes several actions similar to those described above with reference to method 400. For example, method 500 includes mapping a first page of persistent memory to an application's virtual address space at 510, receiving a first store instruction at 520, copying the first page to a new page of persistent memory at 530, updating the virtual address space at 540, executing a first store instruction at 550, updating a file mapping at 570, and updating the virtual address space at 580. Method 500 also includes recording initiation of a first transaction in a transaction log of the persistent memory at 525.

Method 500 also includes creating a copy record associated with the first transaction at 535. This may associated the address of the first page and the address of the new page in the transaction log. Method 500 also includes recording completion of the first transaction at 590. Logging may be performed to facilitate rolling back changes made by a transaction prior to completion of the transaction. Logging completion of the transaction may signal the transaction has fully completed including persistence of changes related to pages involved in the transaction. Notably, because logging completion of the transaction is the final action taken, the entire transaction may be reverted in the event of a failure up to this point.

Method 500 also includes receiving a second store instruction at 560, and executing the second store instruction at 565. In some examples, the second store instruction may be associated with a second transaction. In these cases method 500 may include merging the first transaction and the second transaction (not shown). When transactions are merged, recording completion of the first transaction at 590 may be delayed until both the first transaction and the second transaction are completed. Whether or not the second store instruction is associated with a second transaction, because the new page of memory is in a read-write mode when the second store instruction is received at 560, actions associated with creating a copy may not need to be re-performed unless the new page has been set to a read-only mode.

Figure 6:
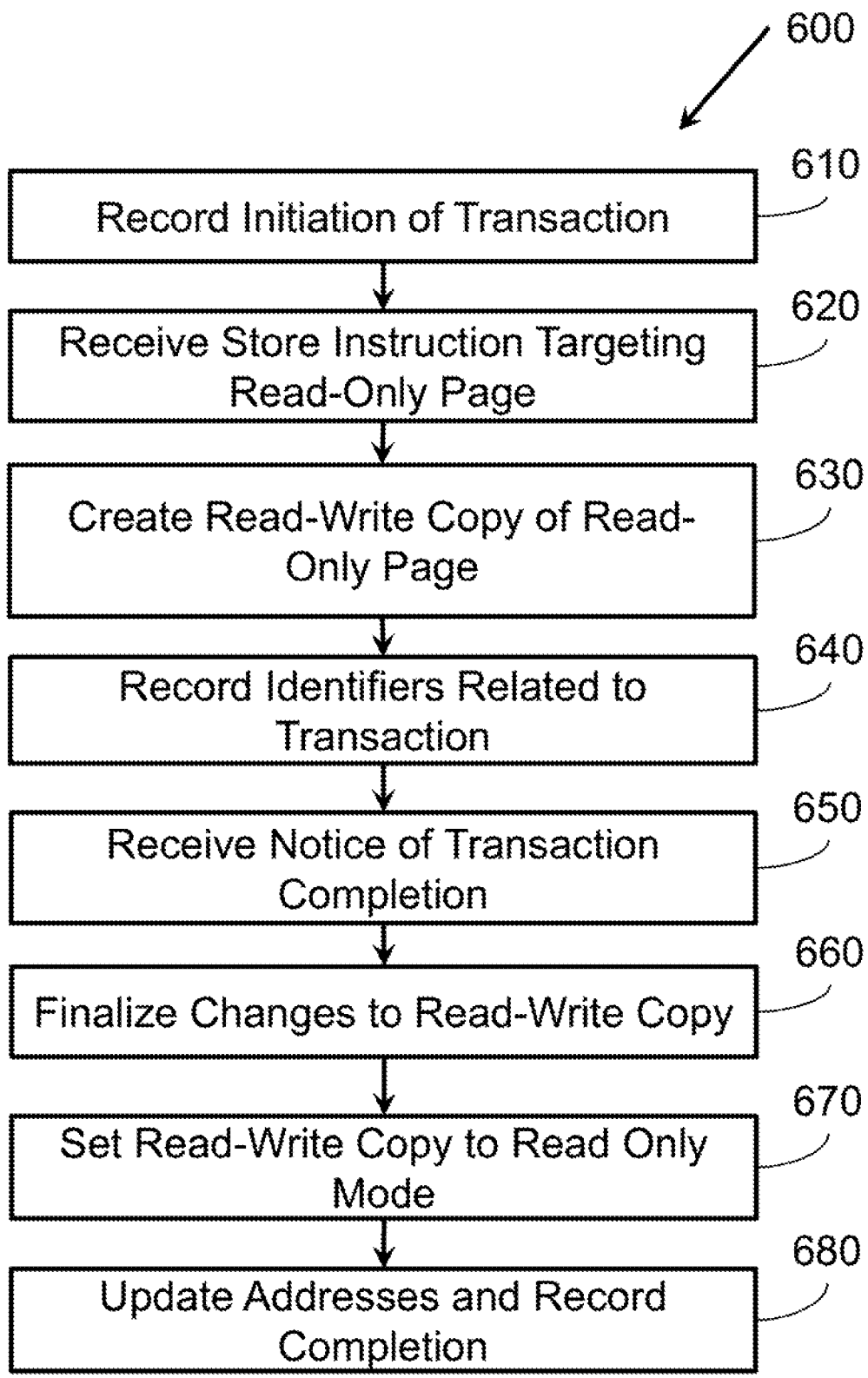
FIG. 6 illustrates another flowchart of example operations associated with persistent memory updating.

FIG. 6 illustrates a method 600 associated with persistent memory updating. Method 600 includes recording initiation of a transaction at 610. The initiation of the transaction may be recorded based on a signal received from an application.

Method 600 also includes receiving a store instruction at 620. The store instruction may be received from an application. The store instruction may target a read-only page of a persistent memory. Method 600 also includes creating a read-write copy of the read-only page at 630. The read-write copy may be created in the persistent memory.

Method 600 also includes recording identifiers related to the transaction at 640. The identifiers may be addresses associated with the read-only page and the read-write copy. Method 600 also includes receiving an indication of completion of the transaction at 650. This indication may be received from the application.

Method 600 also includes finalizing changes made to the read-write copy at 660. Finalizing changes made to the read-write copy may include flushing changes from a version of the read-write copy held in a volatile memory to the read-write copy in the persistent memory.

Method 600 also includes setting the read-write copy to a read-only mode at 670. Method 600 also includes updating an address associated with the read-only page to an address associated with the read-write copy at 680. Completion of the transaction is also recorded at action 680.

In some examples method 600 may also include recovering from a crash prior to recording completion of the transaction (not shown). Recovering from the crash may involve reverting an address associated with the read-write copy to an address associated with the read-only page.

Additionally, method 600 may also include updating a virtual memory address of the application storing an address of the read-only page to an address of the read-write copy (not shown). In this example, method 600 may also include updating the virtual memory address to signify that the read-write copy has been set to the read-only mode.

Figure 7:
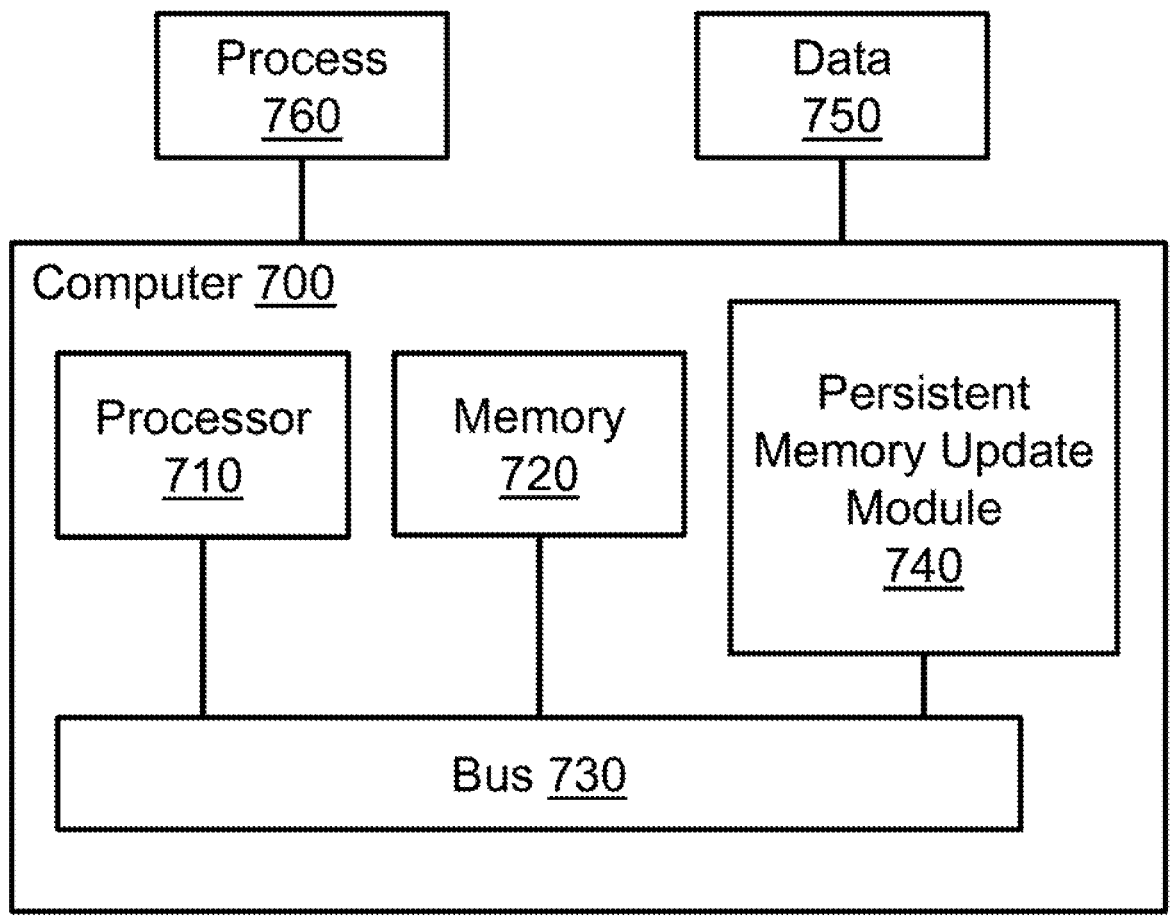
FIG. 7 illustrates an example computing device in which example systems, and methods, and equivalents, may operate.

FIG. 7 illustrates an example computing device in which example systems and methods, and equivalents, may operate. The example computing device may be a computer 700 that includes a processor 710 and a memory 720 connected by a bus 730. Computer 700 includes a persistent memory updating module 740. Persistent memory updating module 740 may perform, alone or in combination, various functions described above with reference to the example systems, methods, and so forth. In different examples, persistent memory updating module 740 may be implemented as a non-transitory computer-readable medium storing processor-executable instructions, in hardware, software, firmware, an application specific integrated circuit, and/or combinations thereof.

The instructions may also be presented to computer 700 as data 750 and/or process 760 that are temporarily stored in memory 720 and then executed by processor 710. The processor 710 may be a variety of processors including dual microprocessor and other multi-processor architectures. Memory 720 may include non-volatile memory (e.g., read-only memory) and/or volatile memory (e.g., random access memory). Memory 720 may also be, for example, a magnetic disk drive, a solid state disk drive, a floppy disk drive, a tape drive, a flash memory card, an optical disk, and so on. Thus, memory 720 may store process 760 and/or data 750. Computer 700 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A system comprising:
a processor; and
a persistent memory comprising memory blocks to store portions of files, the persistent memory to store:
file mappings that map the portions of files to the memory blocks in which the portions of files are stored,
a transaction log, and
a page table to map virtual addresses used by an application to the memory blocks of the persistent memory;
wherein the persistent memory stores machine-readable instructions executable on the processor to:
create a transaction record responsive to an initiation of a transaction by the application,
responsive to receiving an instruction from the application to modify a file portion in a read-only memory block, create a read-write copy of the file portion, record, in the transaction record, an association between the file portion in the read-only memory block and the read-write copy, and update an address in the page table associated with the read-only memory block to an address associated with the read-write copy, and
responsive to receiving an indication from the application that the transaction is complete, cause persistence of the transaction record in the transaction log, cause persistence of changes made to the read-write copy, update a file mapping associated with the read-only memory block to point to the read-write copy, and record a completion of the transaction.

2. The system of claim 1, wherein the machine-readable instructions are executable on the processor to, responsive to detecting a failure of an aspect of the system prior to recording the completion of the transaction, restore to a prior state at least one of a page table entry or a file mapping.

3. The system of claim 1, wherein the machine-readable instructions are executable on the processor to merge the transaction with a second transaction responsive to a second application sending a store instruction to modify the file portion in the read-only memory block associated with the second transaction.

4. The system of claim 3, wherein the machine-readable instructions are executable on the processor to cause the persistence of the transaction record in the transaction log, cause the persistence of the changes made to the read-write copy, update the file mapping, and record the completion of the transaction, after receiving both the indication from the application that the transaction is complete and an indication from the second application that the second transaction is complete.

5. The system of claim 1, wherein the persistent memory is one of phase-change memory, spin-transfer torque memory, resistive random-access memory, or memristor memory.

6. The system of claim 1, comprising a volatile memory, wherein causing the persistence of the changes made to the read-write copy comprises flushing changes made to a version of the read-write copy in the volatile memory to the read-write copy in the persistent memory.

7. The system of claim 1, wherein the machine-readable instructions are executable on the processor to:
responsive to receiving the indication from the application that the transaction is complete, update the page table to change a state of a memory block of the persistent memory storing the read-write copy to read-only.

8. The system of claim 1, wherein the page table indicates the read-only memory block as read-only.

9. The system of claim 8, wherein the machine-readable instructions are executable on the processor to:

responsive to receiving the instruction from the application to modify the file portion in the read-only memory block, create the read-write copy by copying the file portion to a given memory block of the persistent memory, and setting, in the page table, an indication of a read-write state for the given memory block.

10. A method comprising:

mapping a first page of a persistent memory to an application's virtual address space in a read-only mode;

receiving, in a system comprising a hardware processor, a first store instruction associated with the first page from the application;

copying, by the system, the first page to a new page of the persistent memory;

updating, by the system, the application's virtual address space to refer to a location of the new page in a read-write mode in the persistent memory;

executing, by the system, the first store instruction on the new page;

updating, by the system, a file mapping in the persistent memory from a location of the first page to the location of the new page; and updating, by the system, the application's virtual address space to indicate that the location of the new page is in a read-only mode.

11. The method of claim 10, comprising:

receiving a second store instruction associated with the first page from the application; and executing the second store instruction on the new page.

12. The method of claim 10, comprising:

recording an initiation of a first transaction in a transaction log in the persistent memory;

recording, in association with the first transaction, an address of the first page and an address of the new page; and recording a completion of the first transaction.

13. The method of claim 12, comprising:

receiving, in association with a second transaction, a second store instruction associated with the first page; and merging the first transaction and the second transaction.

14. The method of claim 13, where recording the completion of the first transaction is delayed until both the first transaction and the second transaction are completed.

15. A non-transitory computer-readable medium storing instructions that, when executed, cause a system comprising a processor to:

record, based on a signal received from an application, an initiation of a transaction;

receive, from the application, a store instruction targeting a read-only page of a persistent memory;

create, in the persistent memory, a read-write copy of the read-only page;

record, in association with the transaction, identifiers for the read-only page and the read-write copy;

receive, from the application, an indication of a completion of the transaction;

finalize changes made to the read-write copy;

set the read-write copy to a read-only mode;

update an address associated with the read-only page to an address associated with the read-write copy; and record the completion of the transaction.

16. The non-transitory computer-readable medium of claim 15, wherein the instructions when executed cause the system to:

recover from a crash prior to recording the completion of the transaction by reverting the address associated with the read-write copy to the address associated with the read-only page.

17. The non-transitory computer-readable medium of claim 15, where finalizing the changes made to the read-write copy includes flushing changes of a version of the read-write copy held in a volatile memory to the read-write copy in the persistent memory.

18. The non-transitory computer-readable medium of claim 15, wherein the instructions when executed cause the system to:

update a mapping of a virtual memory address of the application from the address associated with the read-only page to the address associated with-the read-write copy; and update the mapping of the virtual memory address to signify that the read-write copy has been set to the read-only mode.

19. The non-transitory computer-readable medium of claim 18, wherein the mapping of the virtual memory address is in a page table stored in the persistent memory.

20. The non-transitory computer-readable medium of claim 15, wherein the instructions when executed cause the system to:

create the read-write copy by copying the read-only page to an empty memory region in the persistent memory.

* * * * *